United States Patent

Numakami

[11] Patent Number: 5,941,123
[45] Date of Patent: Aug. 24, 1999

[54] NOISE INSULATION ARRANGEMENT FOR SHIFT LEVER

[75] Inventor: Youichi Numakami, Chiba, Japan

[73] Assignee: Kinugawa Rubber Ind. Co., Ltd, Chiba, Japan

[21] Appl. No.: 09/041,962

[22] Filed: Mar. 13, 1998

Related U.S. Application Data

[62] Division of application No. 08/594,990, Jan. 31, 1996.

[30] Foreign Application Priority Data

Jan. 31, 1995 [JP] Japan .................................. 7-13610

[51] Int. Cl.⁶ .............................. G05G 9/00; F16J 15/52
[52] U.S. Cl. .......................... 74/18.1; 74/473 R; 74/18; 74/558.5
[58] Field of Search ................. 74/18.1, 473 R, 74/18, 558.5; 277/212 FB; 464/175

[56] References Cited

U.S. PATENT DOCUMENTS

| | | | |
|---|---|---|---|
| 2,620,208 | 12/1952 | Patch et al. | 74/18 |
| 3,926,068 | 12/1975 | Jantzen et al. | 74/473 R |
| 4,018,099 | 4/1977 | O'Brien et al. | 74/473 R |
| 4,522,081 | 6/1985 | Mackin et al. | 74/473 R |
| 4,557,491 | 12/1985 | Orain | 277/212 FB |
| 4,581,951 | 4/1986 | Watson | 74/473 R |
| 4,793,620 | 12/1988 | Karch | 74/566 X |
| 4,840,386 | 6/1989 | Peitsmeier et al. | 277/212 |
| 4,991,457 | 2/1991 | Chen | 74/473 R |
| 5,016,485 | 5/1991 | Kato | 74/18.1 |

FOREIGN PATENT DOCUMENTS

| | | |
|---|---|---|
| 41 01 326 | 7/1992 | Germany . |
| 48-30784 | 9/1973 | Japan . |
| 5-27293 | 7/1993 | Japan . |

*Primary Examiner*—Vinh T. Luong
*Attorney, Agent, or Firm*—Foley & Lardner

[57] ABSTRACT

A noise insulation arrangement reduces transmission of noise through an opening of a partition having a margin with a perimeter defining the opening. A shift lever assembly extends through the opening. This arrangement uses a noise insulator including a first noise barrier portion disposed in the opening adjacent to the perimeter of the partition and a first resilient portion extending between the first noise barrier and the shift lever assembly. A insulator cover is connected between the shift lever of the shift lever assembly and the margin of the partition. The cover includes a second noise barrier portion disposed adjacent to the perimeter and a second flexible portion. The second resilient portion is in the form of a bellows extending over the first resilient portion of the noise insulator.

14 Claims, 3 Drawing Sheets

FIG.3
FIG.4
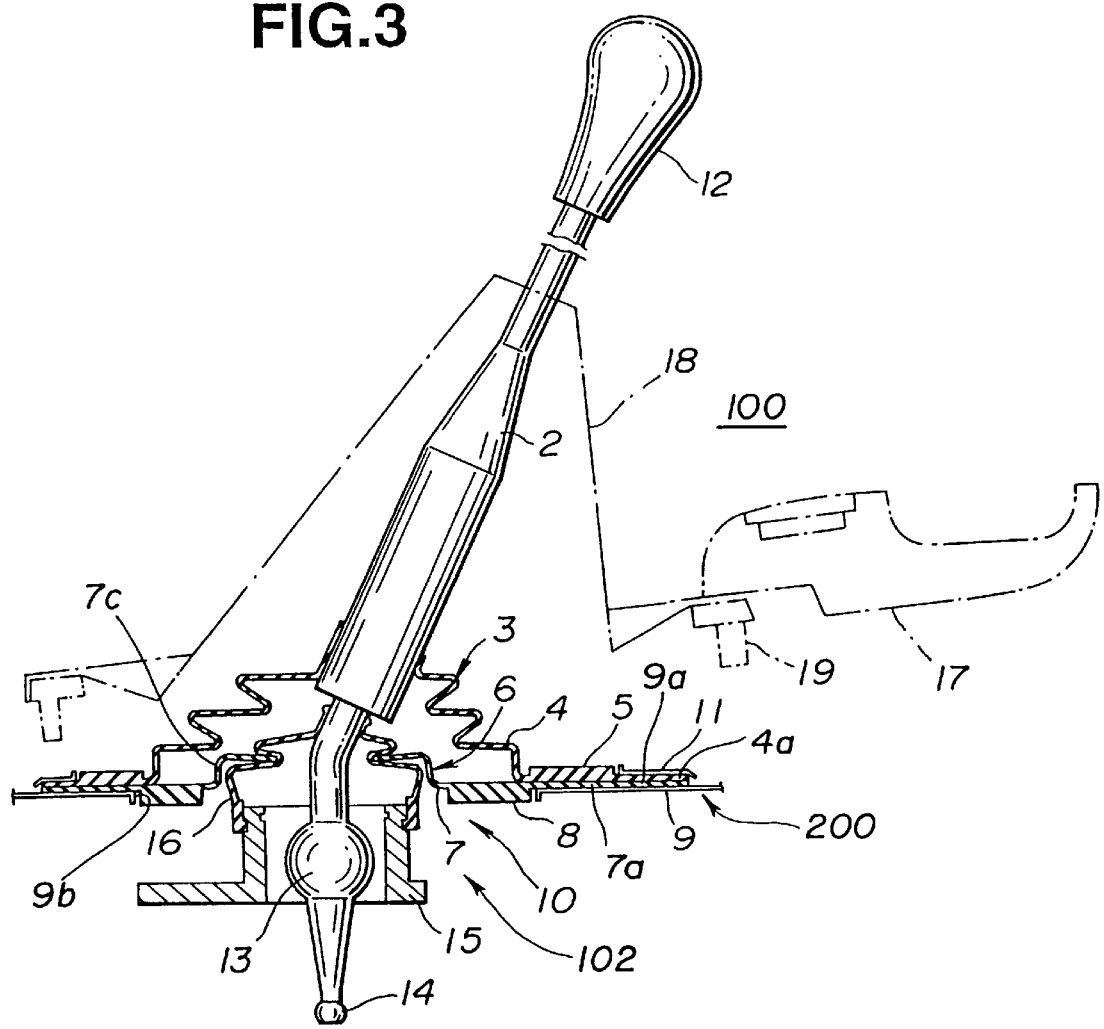
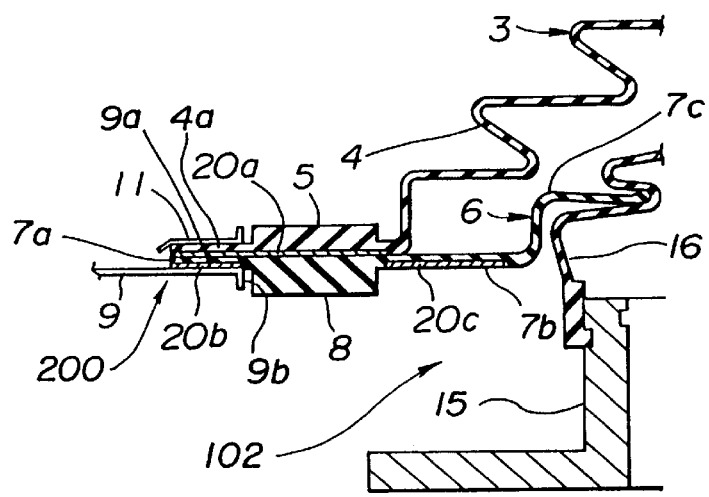

5,941,123

NOISE INSULATION ARRANGEMENT FOR SHIFT LEVER

This is a divisional of application Ser. No. 08/594,990, filed Jan. 31, 1996.

BACKGROUND OF THE INVENTION

1. Field of the Invention

The present invention relates to a noise insulation arrangement for reducing transmission of noise through an opening through which a transmission gear shift lever extends into a vehicle occupant compartment.

2. Description of the Prior Art

Automobiles have a transmission separated from a vehicle occupant compartment by a partition or floor panel. The transmission includes a gear shift lever assembly extending through an opening of the partition into the vehicle occupant compartment. In order to reduce noise transmission through the opening of the partition, there have been proposed various noise insulation arrangements of which two examples are described in connection with JP-B 48-30784 (U) and JP-B 5-27293 (U).

JP-B 48-30784 (U) discloses a noise insulation arrangement in which a generally conic cover is connected between a shift lever and a partition having a margin with a perimeter defining an opening through which the shift lever extends. The cover includes an inner cover portion extending from the margin toward a shift lever retainer of a transmission to fit in a peripheral notch with which the shift lever retainer is formed. The cover includes an outer conic or bellows-like cover portion extending over the inner cover. It has been also proposed to fill a chamber or space defined by the inner and outer cover portions with foamed synthetic resin. According to this known arrangement, the inner cover portion serves as a dust boot, thus unnecessiating the use of a separate dust boot.

JP-B 5-27293 (U) discloses a noise insulation arrangement that uses a single piece dust boot serving as a noise insulator. The boot includes a first boot portion connected between a shift lever ball retainer and a partition or body floor to cover an opening in which the retainer is disposed. From the shift lever ball retainer, a shift lever extends into a vehicle occupant compartment. The first boot portion is fixedly connected to the outer periphery of the shift lever ball retainer at its inner inner periphery. The first boot portion has a corrugated section and a first flat section. The first flat section lies on the corrugated section and extends beyond the outer periphery of the corrugated section to define a fixing lip placed on the partition at a margin with a perimeter defining the opening. The corrugated section extends between the perimeter defining the opening and the outer periphery of the shift lever ball retainer. At a location adjacent the periphery of shift lever ball retainer, the corrugated section is connected to a second boot portion. The second boot portion has a second flat section lying on the first flat section and a conic bellows-like section connected between the second flat section and the shift lever. The second flat section is not fixed to the first flat section but slidable to reduce resistance objectionable to smooth movement of the shift lever.

An object of the present invention is to provide a noise insulation arrangement in which such known single piece dust cover is not used.

SUMMARY OF THE INVENTION

According to the present invention, there is provided a noise insulation arrangement comprising a partition cover, a shift lever assembly, a noise insulator, and an insulator cover. The partition cover has a perimeter defining an opening. The shift lever assembly extends through the opening and includes a shift lever movable within the opening relative to the perimeter. The noise insulator extends in the opening. The noise insulator includes a first noise barrier portion disposed in the opening adjacent to the perimeter and extends along the perimeter through the whole length thereof, and a first resilient portion extending between the first noise barrier portion toward the shift lever. The insulator cover is connected to the shift lever and the partition cover. The insulator cover includes a second noise barrier portion disposed over the perimeter and extends along the perimeter through the whole length thereof, and a second resilient portion extending from the second noise barrier portion to the shift lever over the first resilient portion.

According to one aspect of the invention, the first noise barrier portion is thicker than the first resilient portion. According to another aspect of the invention, the second noise barrier portion is thicker than the second resilient portion. The second noise barrier portion covers the first noise barrier portion.

According to another aspect of the invention, the second resilient portion extends over the first resilient portion and the first noise barrier portion. The second noise barrier portion can be placed over the partition cover surrounding the first noise barrier portion.

BRIEF DESCRIPTION OF THE DRAWINGS

FIG. 3 is a similar view to FIG. 1 illustrating a second embodiment of noise insulation arrangement according to the present invention; and FIG. 4 is a fragmentary enlarged view of FIG. 1 illustrating modification on the first embodiment.

DESCRIPTION OF THE PREFERRED EMBODIMENTS

Figure 1:
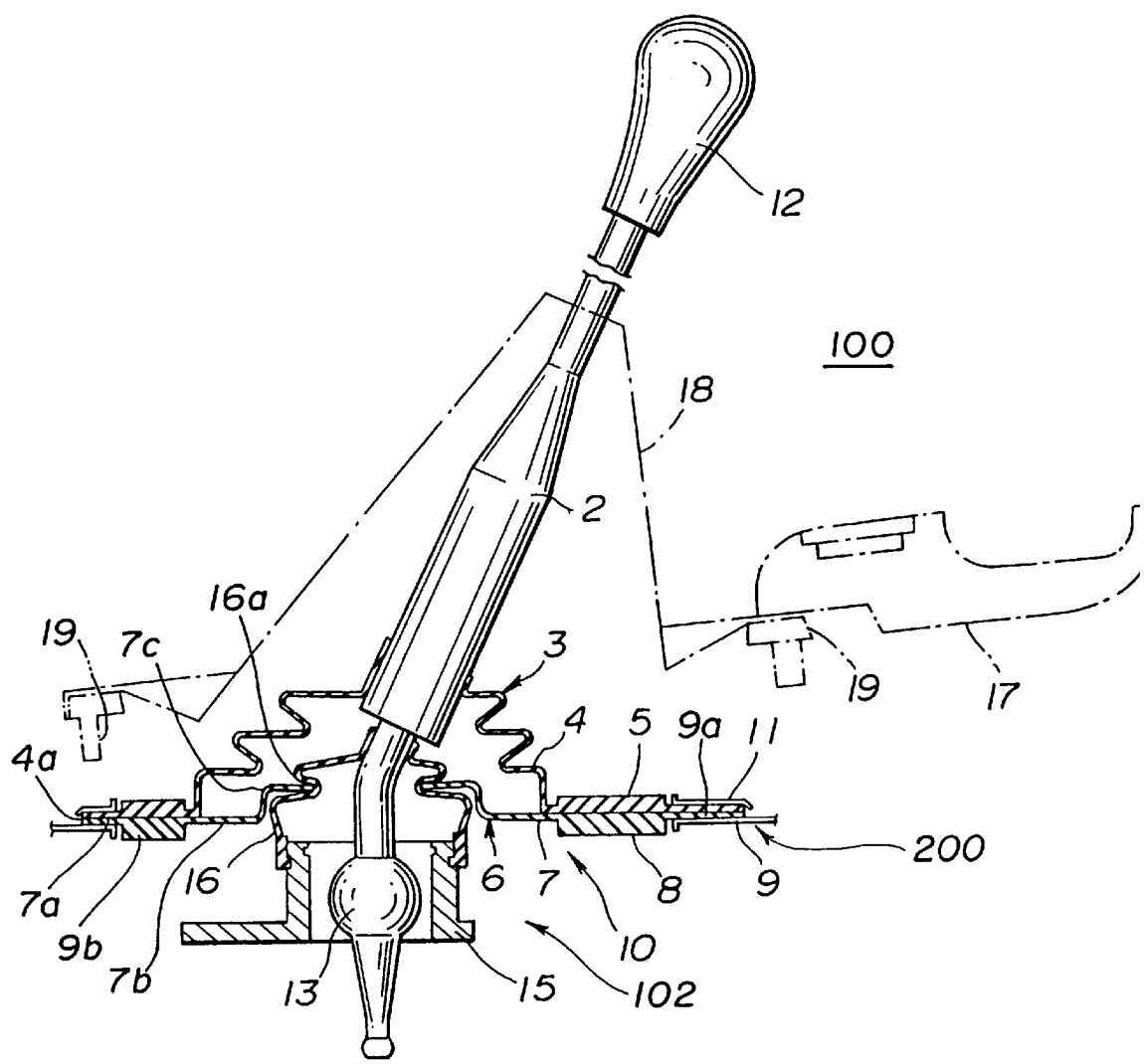
FIG. 1 is a schematic view partly sectioned to illustrate a first embodiment of a noise insulation arrangement according to the present invention.

In the accompanying drawings like or similar parts are designated by the same or like reference numerals throughout the Figures.

Figure 2:
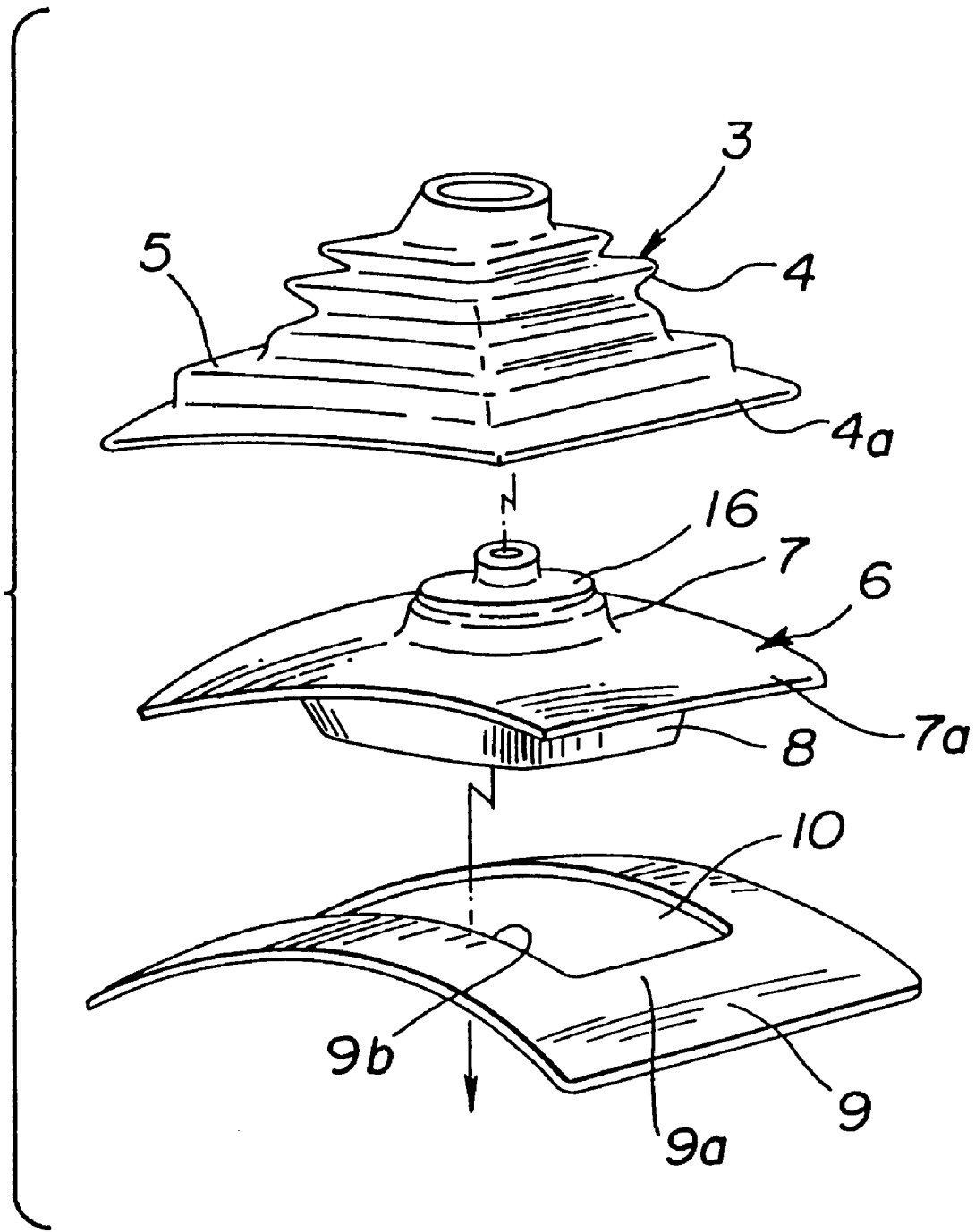
FIG. 2 is an exploded view of component parts used in the noise insulation arrangement.

Referring to FIGS. 1 and 2, there is shown a portion of an automobile having a manual transmission. The manual transmission is operable to shift to any one of discrete gears by a shift lever 2 of a shift lever assembly 102. The shift lever assembly 102 includes a ball retainer 15 rotatably receiving a relatively large ball 13 of the shift lever 2 for allowing movement of the shift lever 2 in response to manipulation of a knob 12 by a vehicle operator. The shift lever assembly also includes a dust boot 16 having a lower end portion, as viewed from in FIG. 1, fitting in a peripheral groove of the ball retainer 15. The dust boot 16 has an upper end portion, as viewed from in FIG. 1, fixedly connected to the adjacent portion of the shift lever 2. In this manner, the dust boot 16 extends between the ball retainer 15 and the shift lever 2 to prevent entry of dust into the ball retainer 15 and to reduce transmission of noise through the ball retainer 15. The dust boot 16 is curved at a portion intermediate the upper and lower end portions to form a peripheral recess 16a.

The shift lever assembly extends into a vehicle occupant compartment 100 separated from the manual transmission by a partition 200 including a partition cover 9 as shown in FIG. 1. Although not shown, the cover 9 fits into an opening of the adjacent component part of the partition 200. As best seen in FIG. 2, the partition cover 9 is part-cylindrical and has a margin 9a with a perimeter 9b defining a rectangular opening 10.

As shown in FIG. 1, the shift lever assembly 102 extends through the opening 10 and includes a shift lever 2 movable within the opening 10 relative to the perimeter 9b. A noise insulator 6 is connected between the shift lever assembly including the dust boot 16 and the margin 9a of the partition cover 9 to close the opening 10. The noise insulator 6 includes a first noise barrier portion 8 and a resilient portion 7. The noise barrier portion 8 is disposed in the opening 10 adjacent to the perimeter 9b and extends along the perimeter through the whole length thereof. The resilient portion 7 extends between the noise barrier portion 8 and the shift lever assembly. The noise insulator 6 includes a fixing lip portion 7a connected to and surrounding the noise barrier portion 8. The fixing lip portion 7a is placed on the margin 9a. The noise insulator 6 fits into the peripheral recess of the dust boot 16 at an inner perimeter thereof. The resilient portion 7 has a flat section 7b adjacent to the noise barrier portion 8 and a curved section 7c between the boot 16 of the shift lever assembly and the flat section 7b. The noise barrier portion 8 is increased in thickness as compared to the resilient portion 7 for increased effectiveness in insulating noise. The noise insulator 6 is made of soft rubber with oil resistant, such as chloroprene rubber (CR) or nitrile rubber (NBR).

An insulator cover 3 is connected between the shift lever 2 and the margin 9a of the partition cover 9. The insulator cover 3 includes a second noise barrier portion 5 disposed adjacent to the perimeter 9b and extends along the perimeter 9b through the whole length thereof and a second resilient portion 4 extending between the noise barrier portion 5 thereof and the shift lever 2 over the resilient portion 7 of the noise insulator 6. The noise barrier portion 5 is placed on the noise barrier portion 8 of the noise insulator 6. The noise barrier portion 5 of the cover 3 is increased in thickness as compared to the flexible portion 4. The flexible portion 4 of the cover 3 extends over the flat section 7b and curved section 7c of the resilient portion 7 of the noise insulator 6. The cover 3 includes a fixing lip portion 4a connected to and surrounding the noise barrier portion 5. The fixing lip portion 4a is placed on the fixing lip portion 7a placed on the margin 9a of the partition 9. The fixing lip portions 4a and 7a are fixedly secured between the margin 9a of the partition cover 9 and a bracket 11 by means of a plurality of fasters, not shown. The resilient portion 4 of the cover 3 is in the form of a bellows and fixedly attached to the shift lever 2 at an upper end thereof, viewing in FIG. 1. The cover 3 is made of a soft rubber or resin, such as chloroprene rubber (CR) or natural rubber (NR) or ethylene-propylene rubber (EPDM) or polyvinyl chloride (PVC).

From the preceding description, it will be appreciated that the noise barrier portion 8 of the noise insulator 6 has an outer periphery conforming to the shape of the perimeter 9b defining the opening 10, serving as a guide in mounting the noise insulator 6 to the partition cover 9, thus making the assembly work easy.

In FIG. 1, the reference numeral 17 denotes a trim panel and the reference numeral 18 denotes a body boot fixedly connected to the trim panel 17. The body boot 18 is attached to the shift lever 12 to conceal the insulator cover 3 and the partition cover 9.

According to the first embodiment of noise insulation arrangement, the noise barrier portion 8 of the noise insulator 6 disposed in the opening 10 adjacent to the perimeter 9b results in reduction in effective area through which noise is transmitted. This is effective in restricting propagation of noise to the vehicle occupant compartment 100. Besides, the noise barrier portions 8 and 5 effectively interrupt propagation of noise to the vehicle occupant compartment 100. Smooth movement of the shift lever 2 is not hampered by the noise barrier portions 8 and 5 because of the provision of the flexible portions 7 and 4 of the noise insulator 6 and cover 3.

Referring to FIG. 3, the second embodiment of noise insulation arrangement is explained. This embodiment is generally the same as the first embodiment except the area of an opening 10 of a partition cover 9 and design of a noise insulator 6. In the second embodiment, the area of the opening 10 is narrower than the area of the opening 10 shown in FIGS. 1 and 2. The noise insulator 6 shown in FIG. 3 is different from the noise insulator 6 shown in FIGS. 1 and 2 in that the outer perimeter of a noise barrier portion 8 of the second embodiment is reduced in size as compared to the outer perimeter of the noise barrier portion 8 of the first embodiment, and in that a first resilient portion 7 of the noise insulator 6 of the second embodiment does not include a flat section as wide as the flat section 7b of the first resilient portion 7 of the noise insulator 6 of the first embodiment although it includes a curved section 7c.

In FIG. 3, the noise barrier portion 8 of the noise insulator 6 is disposed in the opening 10 adjacent to a perimeter 9b defining the opening 10 and extends along the perimeter 9b through the whole length thereof. The curved section 7c extends between a dust boot 16 of a shift lever assembly and the noise barrier portion 8. The noise insulator 6 includes a fixing lip portion 7a connected to and surrounding the noise barrier portion 8. The fixing lip portion 7a is placed on a margin 9a of the partition 9.

A cover 3 of the second embodiment is substantially the same as the insulator cover 3 of the first embodiment shown in FIGS. 1 and 2.

In FIG. 3, the insulator cover 3 includes a noise barrier portion 5 and a fixing lip portion 4a connected to and surrounding the noise barrier portion 8. As different from the first embodiment, not only the fixing lip portion 4a but also the noise barrier portion 5 are placed on the fixing lip portion 7a placed on the margin 9a. The fixing lip portions 4a and 7a are fixedly interposed between the partition cover 9 and a retainer 11 by means of fastners, not shown. Thus, the fixing lip portions 4a and 7a are fixedly secured to the margin 9a of the partition cover 9. As different from the first embodiment, a second resilient portion 4 of the cover insulator 3 extends over the curved section 7c and the noise barrier portion 8 of the noise insulator 6. According to the second embodiment, the area of the opening 10 is reduced further, resulting in more effective prevention of propagation of noise into a vehicle occupant compartment 100.

Referring to FIG. 4, a modification of the first embodiment shown in FIGS. 1 and 2 is explained. This modification is made to improve noise insulation performance. In FIG. 4, a plate or insert 20a made of metal is placed on the noise barrier portion 8 and fixing lip portion 7a of the noise insulator 6. The noise barrier portion 5 of the cover 3 is placed over the noise barrier portion 8 and on the plate 20a, and the fixing lip portion 4a is placed over the fixing lip portion 7a and on the plate 20a. Another plate or insert 20b of metal is placed on the margin 9a of the cover 9 and the fixing lip portion 7a is placed on this another plate 20b. The fixing lip portion 4a, plate 20a, fixing lip portion 7a and plate 20b are fixedly interposed between the margin 9a and the retainer 11 by means of fastners. A third plate 20c of metal is fixedly placed on the flat section 7b of the flexible portion of the noise insulator 6. Preferably, the plate 20a slightly overlaps the plate 20c.

According to the modification shown in FIG. 4, noise insulating performance is improved.

What is claimed is:

1. A noise insulation arrangement comprising:

a partition cover having a perimeter defining an opening;

a shift lever assembly extending through the opening, the shift lever assembly including a shift lever movable within the opening relative to the perimeter;

a noise insulator extending in the opening, the noise insulator including a first noise barrier portion disposed in the opening adjacent to the perimeter and extending along the perimeter through the whole length thereof, and a first resilient portion extending from the first noise barrier portion toward the shift lever, the first noise barrier portion being thicker than the first resilient portion; and an insulator cover connected to the shift lever and the partition cover, the insulator cover including a second noise barrier portion disposed over the perimeter and extending along the perimeter through the whole length thereof, and a second resilient portion extending from the second noise barrier portion to the shift lever over the first resilient portion, the second noise barrier portion being thicker than the second resilient portion, wherein the second noise barrier portion is placed over the partition cover surrounding the first noise barrier portion.

2. A noise insulation arrangement according to claim 1, wherein the first resilient portion has a curved section adjacent to the first noise barrier portion and a substantially flat section extending from the curved section toward the shift lever.

3. A noise insulation arrangement according to claim 2, wherein the second resilient portion extends over the first resilient portion and the first noise barrier portion.

4. A noise insulation arrangement according to claim 3, wherein the shift lever includes a ball and the shift lever assembly includes a ball retainer receiving the ball and a dust boot extending between the ball retainer and the shift lever.

5. A noise insulation arrangement according to claim 4, wherein the dust boot is curved to form a peripheral recess.

6. A noise insulation arrangement according to claim 5, wherein the first resilient portion fits into the peripheral recess at an inner perimeter thereof.

7. A noise insulation arrangement according to claim 6, wherein the second resilient portion extends over the dust boot.

8. A noise insulation arrangement according to claim 7, wherein the second flexible portion is in the form of a bellows.

9. A noise insulation arrangement according to claim 8, wherein the noise insulator is selected from a group consisting of chloroprene rubber, natural rubber, ethylenepropylene rubber, and polyvinyl chloride.

10. A noise insulation arrangement according to claim 1, wherein the noise insulator includes a first fixing lip portion connected to the first noise barrier portion and surrounding the first noise barrier portion.

11. A noise insulation arrangement according to claim 1, wherein the insulator cover includes a second fixing lip portion connected to the second noise barrier portion and surrounding the second noise barrier portion.

12. A noise insulation arrangement according to claim 11, wherein the insulator cover includes a second fixing lip portion connected to the second noise barrier portion and surrounding the second noise barrier portion.

13. A noise insulation arrangement according to claim 12, wherein the first fixing lip portion is placed on the partition cover and the second fixing lip portion and the second noise barrier portion are placed on the first fixing lip portion, and the first and second fixing lip portions being secured to the partition cover.

14. A noise insulation arrangement comprising:

a partition cover having a perimeter defining an opening;

a shift lever assembly extending through the opening and including a shift lever with a ball movable within the opening relative to the perimeter, the shift lever assembly including a ball retainer receiving the ball and a dust boot extending between the ball retainer and the shift lever, the dust boot having a curved peripheral recess;

a noise insulator extending in the opening, the noise insulator including:

a first noise barrier portion disposed in the opening adjacent to the perimeter and extending along the perimeter through the whole length thereof; and a first resilient portion having a curved section extending from the first noise barrier portion and a flat section extending from the curved section into the peripheral recess at an inner perimeter thereof; and an insulator cover covering the noise insulator, the insulator cover including:

a second noise barrier portion disposed adjacent to the opening on the partition cover and extending along the perimeter through the whole length thereof; and a second resilient portion extending from the second noise barrier portion to the shift lever over the flat section, the curved section, and the first barrier portion of the first resilient portion.

* * * * *